US012139133B1

United States Patent
Schleede et al.

(10) Patent No.: US 12,139,133 B1
(45) Date of Patent: Nov. 12, 2024

(54) TRAINING VEHICLE BEHAVIOR LABELS

(71) Applicant: Zoox, Inc., Foster City, CA (US)

(72) Inventors: Peter Scott Schleede, Foster City, CA (US); Prateek Chandresh Shah, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 182 days.

(21) Appl. No.: 17/364,323

(22) Filed: Jun. 30, 2021

(51) Int. Cl.
| | |
|---|---|
| *B60W 30/09* | (2012.01) |
| *B60W 10/18* | (2012.01) |
| *B60W 10/20* | (2006.01) |
| *B60W 30/095* | (2012.01) |
| *B60W 30/16* | (2020.01) |
| *B60W 50/06* | (2006.01) |
| *B60W 60/00* | (2020.01) |
| *G06F 18/214* | (2023.01) |
| *G06F 18/2431* | (2023.01) |

(Continued)

(52) U.S. Cl.
CPC ............ *B60W 30/09* (2013.01); *B60W 10/18* (2013.01); *B60W 10/20* (2013.01); *B60W 30/0956* (2013.01); *B60W 30/162* (2013.01); *B60W 50/06* (2013.01); *B60W 60/0013* (2020.02); *B60W 60/0015* (2020.02); *G06F 18/214* (2023.01); *G06F 18/2431* (2023.01); *G06N 20/00* (2019.01); *G06V 20/56* (2022.01)

(58) Field of Classification Search
CPC ...... B60W 30/09; B60W 10/18; B60W 10/20; B60W 30/0956; B60W 30/162; B60W 50/06; B60W 60/0013; B60W 60/0015; G06F 18/214; G06F 18/2431; G06N 20/00; G06V 20/56
See application file for complete search history.

(56) References Cited

U.S. PATENT DOCUMENTS

| | | | | |
|---|---|---|---|---|
| 9,347,779 | B1 * | 5/2016 | Lynch | G01S 19/393 |
| 11,126,763 | B1 * | 9/2021 | Gabrovski | G05D 1/0088 |

(Continued)

FOREIGN PATENT DOCUMENTS

| | | | | |
|---|---|---|---|---|
| EP | 3961598 | A1 * | 3/2022 | G06N 3/006 |
| WO | WO-2021079442 | A1 * | 4/2021 | G06F 18/2155 |

OTHER PUBLICATIONS

Hancock, Weak Supervision from High-Level Abstractions; Department of Computer Science, Stanford University, Aug. 2019, 125 pages.

*Primary Examiner* — Jelani A Smith
*Assistant Examiner* — Nada Mahyoob Alqaderi
(74) *Attorney, Agent, or Firm* — Lee & Hayes, P.C.

(57) ABSTRACT

Techniques for determining classifications associated with vehicle behavior by a machine learned model are discussed herein. A computing device can combine a variety of classifier labels as input to train a machine learned model to determine classifications that represent a vehicle behavior as either good behavior or bad behavior. The machine learned model may receive weak classifier labels that classify an aspect of a vehicle behavior as "good," "bad," or "unknown" (relative to the classification) to generate training data for training the machine learning model. Data associated with a vehicle or simulated vehicle may be input to the trained machine learned model to classify good vehicle behavior or bad vehicle behavior even when the model has not been exposed to the precise scenarios represented in the training data.

18 Claims, 5 Drawing Sheets

(51) Int. Cl.
    *G06N 20/00*        (2019.01)
    *G06V 20/56*        (2022.01)

(56) References Cited

U.S. PATENT DOCUMENTS

| | | |
|---|---|---|
| 11,334,814 B2 * | 5/2022 | Chen .................... G06N 20/20 |
| 2010/0110936 A1 * | 5/2010 | Bailey ................ H04L 47/2441 |
| | | 370/256 |
| 2017/0144671 A1 * | 5/2017 | Memani ................ G06Q 40/12 |
| 2017/0267253 A1 * | 9/2017 | Schmidt ................ B60W 50/14 |
| 2018/0170393 A1 * | 6/2018 | Decker ................ B60W 40/09 |
| 2019/0161080 A1 * | 5/2019 | Gochev ............... B60W 60/001 |
| 2019/0164007 A1 * | 5/2019 | Liu ........................ G06V 20/54 |
| 2019/0202414 A1 * | 7/2019 | Shih ...................... B60L 53/665 |
| 2020/0033845 A1 * | 1/2020 | Park ....................... G08G 1/164 |
| 2020/0034634 A1 * | 1/2020 | Warshauer-Baker ...................... |
| | | B60W 10/18 |
| 2020/0130662 A1 * | 4/2020 | Buerkle ................ B60W 30/09 |
| 2020/0216079 A1 * | 7/2020 | Mahajan ............. G05D 1/0061 |
| 2021/0146785 A1 * | 5/2021 | Wang .................... G06N 20/00 |
| 2021/0154861 A1 * | 5/2021 | Weiss ........................ B66F 9/24 |
| 2022/0219691 A1 * | 7/2022 | Maleki ................. G06F 11/079 |
| 2022/0355802 A1 * | 11/2022 | Chaves ................... H04W 4/44 |
| 2023/0162508 A1 * | 5/2023 | Xia ................ B60W 60/00274 |
| | | 382/104 |

* cited by examiner

TRAINING VEHICLE BEHAVIOR LABELS

BACKGROUND

Machine learning algorithms such as neural networks are often trained to perform a task by considering training data. For example, image data that has been previously associated with a classification may be fed into a neural network to train the neural network to recognize the classification. The training data and associated classification can be "hand-tuned" by a human that reviews an image and determines what the image represents. This type of training data is sometimes referred to as strong labeled data because accuracy of the classification is typically high due to hand tuning. Training data may also be labeled by a computing device which typically has lower accuracy than hand-tuned labels, and are therefore referred to as weak labeled data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
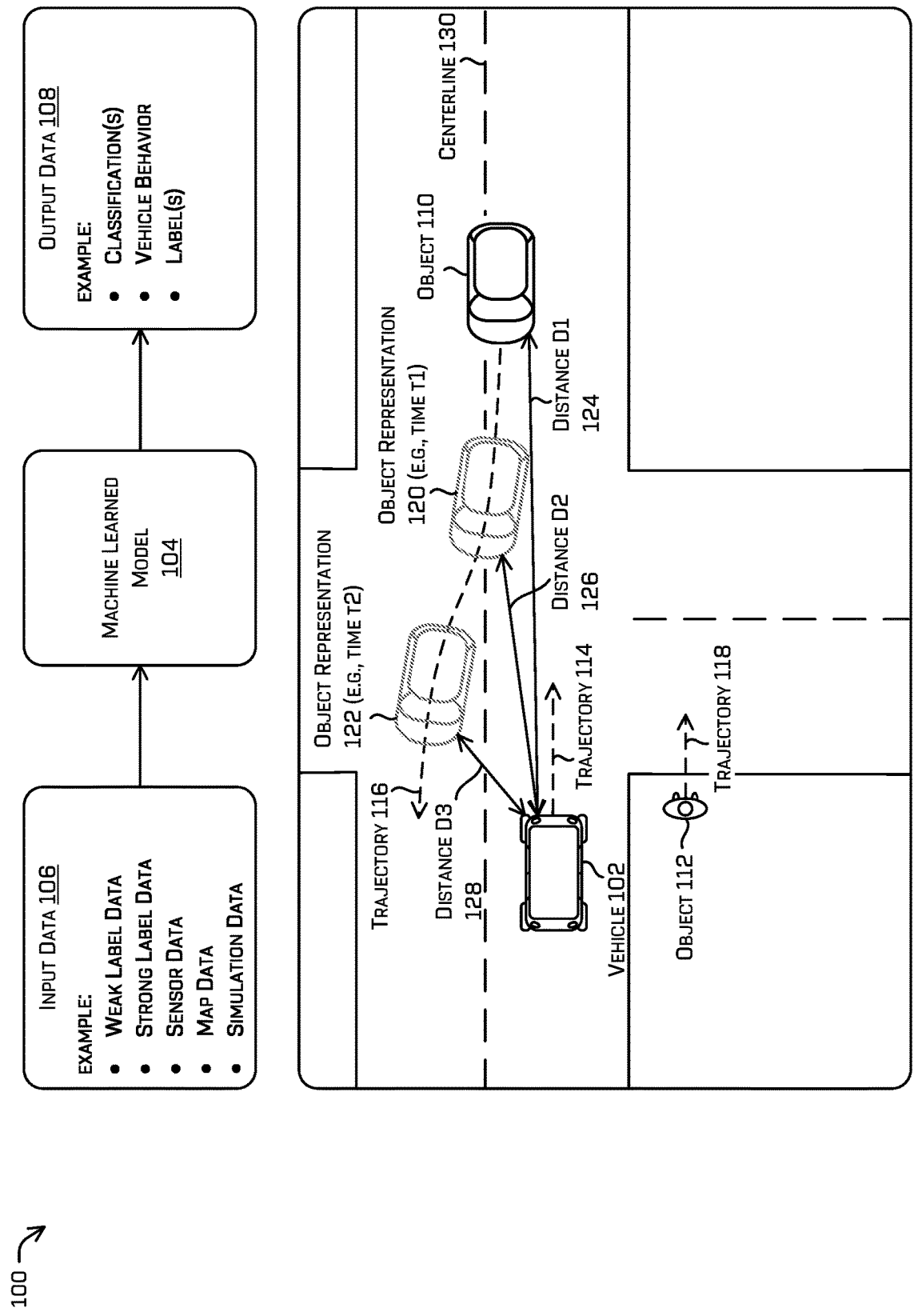
FIG. 1 is an illustration of an example environment in which an example machine learned model determines classifier labels indicating an example behavior for a vehicle relative to one or more example objects.

This disclosure relates to techniques for training a machine learned model to determine classifications associated with vehicle behavior. The techniques can include implementing a computing device that combines a variety of classifier labels as input to train a machine learned model to determine classifications that represent a vehicle behavior as either good behavior or bad behavior. In some examples, the machine learned model may receive weak classifier labels that classify an aspect of a vehicle behavior as "good," "bad," or "unknown" (relative to the classification). For example, a time to collision below a first value may be a "bad" behavior, a time to collision above a second value may be "good" behavior, and a time to collision between the first value and second value may be "unknown" (e.g., neither good nor bad). That is, labeling functions may not be directly applicable to all log data (e.g., data associated with previously captured sensor data and/or simulation data). In some examples, a plurality of weak classifier labels (e.g., labeling functions) may be applied to log data to either classify behavior as good, bad, or unknown. The weak classifier labels can be used as training data to train a machine learning model to determine whether vehicle behavior, in the aggregate, is either good or bad behavior.

In this manner, the weak classifier labels can be used to quantify some aspects of vehicle behavior as good, bad, or unknown to generate training data for training a machine learning model. When log data representing a vehicle or simulated vehicle is input to the machine learned model trained in this manner, the machine learned model can generalize to classify behavior as good vehicle behavior or bad vehicle behavior even when the model has not been exposed to the precise scenarios represented in the training data. In some examples, the log data can represent vehicle state data, object state data, environmental data, messages between vehicle components, commands, etc. which can be combined with the weak classifier labels (e.g., weak label data) to generate training data. As further described herein, a model trained based on the training data can generalize to predict or otherwise evaluate behavior of a vehicle in environments or situations that are not described by the log data or the weak label data. Thus, the model can be used to identify metrics such as time to collision, lateral distance, and so on, in complex driving environments that lead to improvements in how the vehicle behaves (e.g., decisions relating to the metrics) when the vehicle navigates in a same of different environment.

Generally, the machine learned model (also referred to as the "model") may provide functionality to generate label data representing a good interaction, a bad interaction, or neither good nor bad interaction. Further, the model can receive weak label data, strong label data, sensor data, simulation data and/or or other data as input, and combine the data to generate training data for the model. Each type of input data can be associated with an accuracy representing a bad interaction or a good interaction in a scenario between a vehicle and the environment and/or the vehicle and an object in the environment. For instance, weak label data may be associated with high precision (likely correct) but low recall (don't apply to all scenarios) while strong label data may be associated with high precision (likely correct) and high recall (applies to more scenarios). In various examples, the model may receive more weak label data than strong label data, and identify one or more behaviors for a vehicle that are not associated with the input data.

By way of example and not limitation, consider a scenario in which a vehicle computing device controls an autonomous vehicle (e.g., control a steering action, a braking action, an acceleration action, and so on) relative to another object, such as another vehicle, pedestrian, bicyclist, and the like. In such examples, the vehicle computing device can utilize a policy (e.g., a requirement) to determine how close to pass a pedestrian or whether to take an action such as swerving or braking to avoid a vehicle approaching the autonomous vehicle. The model can receive label data that describes how the autonomous vehicle should behave in such examples including but not limited to determining a safe lateral distance to the pedestrian or determining whether the approaching vehicle will result in a potential intersection, and if so when to initiate an action to avoid the other vehicle. By using the techniques as described herein, the model can determine an operative classifier that is usable by the vehicle computing device to initiate the action thereby improving safety of the autonomous vehicle. In some examples, the machine learned model can identify a time threshold or distance threshold usable by the autonomous vehicle for when and where to initiate an action to avoid the other vehicle, pedestrian, and so on.

While weak label data generally has low recall (e.g., does not necessarily apply to all scenarios), using the techniques as described herein the model can combine weak label data with other weak label data that in the aggregate, has a high recall (e.g., applies to more scenarios including a scenario not described by or represented by the input data). For example, the model may output a classifier label (e.g., a classification) representing a behavior of the vehicle such as one or more of: a distance to an object, an acceleration action, a braking action, a steering action, a speed limit, or a comfort metric representing comfort of a passenger of the vehicle. In this way, the model can be used to improve decisions, predictions, evaluations, or determinations made by a vehicle computing device in relation to objects or features in the environment (make more precise predictions regarding a time to collision, provide adequate space to pass an object, avoid following a parked car, and so on).

In various examples, the model may be trained with input data (e.g., weak label data) that is received over time and/or represents data collected over a time period in which a vehicle navigates in an environment. In such examples, the model can output data identifying areas or regions in the environment that represent a good region (e.g., a safe region to navigate) and/or a bad region (e.g., a less safe region to navigate). For instance, training the model may include applying a sigmoid function, a hyperbolic tangent function, or other function that generalizes the area or region as good or bad based at least in part on "carving out" space in the environment associated with each weak label in the weak label data. To further illustrate, weak label data may be used to generate a graph similar to a Venn diagram that shows continuous output values and regions. The determined good and/or bad regions by the model can be used to adjust how the vehicle behaves in the respective regions, for example (the model can identify where good vehicle behavior is likely or unlikely and navigate accordingly). Further description of determining qualitative vehicle behavior from weak label data can be found throughout this disclosure.

In some examples, a computing device (e.g., a vehicle computing device or a computing device remote therefrom) can receive an output (e.g., a classification) from the machine learned model and perform a simulation to verify safety of the vehicle. Further, the computing device can, based at least in part on the simulation, train the machine learned model to output an additional classifier label and/or to improve accuracy of the classification output by the model.

In some examples, the output from the model can be used to modify one or more settings or parameters (operational parameters) associated with a perception component, a prediction component, or a planning component of a vehicle computing device that controls the vehicle. In this way, objects detected by the vehicle computing device, predictions such as a vehicle trajectory and/or an object trajectory can be determined with more accuracy versus not implementing the model. For instance, in examples in which one or more of the aforementioned components utilize a tree search to make predictions or determinations, weak label data can be used to improve decisions by the tree search by identifying good vehicle behavior or a good region of a branch and/or identifying bad vehicle behavior or a bad region. In some examples, vehicle actions can be explored as various branches of a tree search and tree branches can be pruned or ignored if a cost associated with an action meets or exceeds a threshold cost or if behavior or actions associated with a branch have been evaluated to represent "bad" behavior. As a non-limiting example, one or more actions may be contemplated at discrete steps in the future (e.g., at fixed time, distance intervals, or some other event-based step). In such an example, the tree may branch at such discrete points based on differing actions that the vehicle could take at those points and the methods described herein may be used in selecting between those branches when expanding the tree. For instance, branches may be explored having the lowest cost and/or in which there is no adverse event (e.g., collision, uncomfortable control, etc.). In such examples, a branch associated with bad behavior (or region) can be pruned whereas a branch associated with good behavior (or region) can proceed to the next step (the next instance of time, next node of a branch, etc.).

An output of the model may also or instead be used to determine a time to initiate an action (e.g., a braking action to cause the vehicle to brake, a steering action to cause the vehicle to steer, or an acceleration action to cause the vehicle to accelerate) by the vehicle relative to features of the environment (e.g., a cross walk, a school zone, traffic signals, and so on). For instance, the model may send information associated with a determined classification to the vehicle computing device to cause the vehicle to improve braking, steering, or acceleration actions relative to traffic signals, crosswalks, and so on.

In various examples, the model can determine a classification based at least in part on top-down multi-channel data indicative of a top-down representation of an environment. The top-down representation may be determined based at least in part on map data and/or sensor data captured from or associated with a sensor of an autonomous vehicle in the environment, and may represent a top-down view of the environment to capture context of the autonomous vehicle (e.g., identify actions of other objects such as vehicles and pedestrians relative to the vehicle).

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data (e.g., log data) usable by the model to predict a classification such as whether the vehicle is likely to intersect with the object.

In some examples, the vehicle may comprise a vehicle safety system implemented separately from the vehicle computing device for improved performance of the vehicle safety system, and/or to provide redundancy, error checking, and/or validation of determinations and/or commands determined by the vehicle computing device. In such examples, the model can be used to verify operation of the vehicle safety system by using an output to modify a requirement or setting used by the vehicle safety system (e.g., a time threshold to initiate an action, a distance threshold to pass an object, and the like). However, in other examples, the vehicle safety system may be implemented as one or more components within the same vehicle computing device.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the model may determine labels for scenarios not described by the input data and/or improve predictions related to the behavior of the vehicle. In some examples, the model may improve functioning and safety of the vehicle by preventing the vehicle from taking additional actions that are not required based on conditions in the environment around the vehicle and/or initiating safety/alternate maneuvers based on determined driving behavior. Further, an output from the model can be used to tune requirements for validating software or other behavior, which can ultimately lead to safer performance of the vehicle. For instance, the techniques may be used to determine whether requirements are too strict (e.g., failing a requirement represents "good" behavior) which enables tuning of requirements to make driving models more efficient and/or better representations of real-world driving behavior. In addition, the techniques described herein can improve passenger comfort and/or vehicle safety such as, for example, avoiding sudden braking or swerving when not needed. Utilizing classification data by a vehicle computing device, for instance, can improve the accuracy and/or reduce a latency for the vehicle to respond to a potential collision in the environment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100 in which an example machine learned model determines classifier labels indicating an example behavior for a vehicle relative to one or more example objects. For instance, a computing device can implement the example machine learned model to determine whether the vehicle is behaving good or bad relative to an object in the environment 100. In some examples, an autonomous vehicle (vehicle 102) can navigate in the environment 100 to a destination while in other examples the environment 100 can represent a simulated environment to test the safety of the vehicle 102.

In various examples, a vehicle computing device (e.g., vehicle computing device 404) and/or a remote computing device (e.g., computing device(s) 436) may implement a machine learned model 104 to receive input data 106 and determine output data 108 representative of a classification, a behavior, and/or one or more labels. While described as a separate system, in some examples, labeling techniques described herein may be implemented by other vehicle systems, components, and/or computing devices. For example, and as will be described in further detail with regard to FIG. 4 (and throughout the disclosure), the labeling information techniques described herein may be implemented at least partially by or in association with a localization component 420, a perception component 422, a prediction component 424, and/or a planning component 426.

In various examples, the machine learned model 104 may be configured to receive a variety of types of input data 106 including weak label data, strong label data, map data, simulation data, log data, and/or sensor data representing object(s) of the environment 100, just to name a few. The weak label data and strong label data can represent one or more labeling functions that classify a position, an action, a metric, or other behavior of the vehicle 102 with varying degrees of recall and precision. Generally, weak label data can classify an aspect of vehicle behavior as "good," "bad," or "unknown" (relative to the classification) with lower recall and/or lower precision than strong label data. For example, a time to collision between the vehicle 102 and an object, such as an object 110 (a vehicle) below a first value may be a "bad" behavior, a time to collision above a second value may be "good" behavior, and a time to collision between the first value and second value may be "unknown" behavior (e.g., neither good nor bad). In various examples, the machine learned model 104 can receive a larger amount of weak label data than strong label data (e.g., data verified by a human or another machine learned model and therefore more likely to result in an accurate "good", "bad," or "unknown" classification). As described herein, by aggregating larger amounts of weak label data with lesser amounts of strong label data (relative to the weak label data), an overall amount of the input data 106 can be determined in less time than requiring strong label data. Additionally, aggregating weak label data enables the machine learned model 104 to identify or determine the output data 108 including a classifier label or vehicle behavior that is not included in the input data 106 (e.g., a good or bad behavior other than time to collision or distance to another object, deviating from a speed limit or reference trajectory, acceleration above or below a threshold value, etc.).

The input data 106 can also or instead include sensor data representing object(s) of the environment 100 associated with one or more sensors of the vehicle 102. For example, a vehicle computing device can be configured to receive the sensor data over time (e.g., log data) and/or in real-time such as via a perception component (e.g., the perception component 422). The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle 102. As yet another example, the objects may be detected based on sensor data received from remote sensors, such as, for example, sensors associated with another vehicle or sensors situated in the environment that are configured to share data with a plurality of vehicles. In various examples, the vehicle 102 may be configured to transmit and/or receive sensor data from other autonomous vehicles. Sensor data representing the detected objects may be used to determine the input data 106 usable by the machine learned model 104 to determine the output data 108 associated with behavior of the vehicle 102.

In some examples, the vehicle computing device may be configured to detect an object in the environment 100, such the object 110 (another vehicle) and object 112 (e.g., a pedestrian). In some examples, the vehicle computing device may be configured to receive, detect, infer, estimate, or otherwise determine one or more paths for the vehicle 102 and/or each detected object. As shown in FIG. 1, the vehicle 102 is associated with a trajectory 114 (e.g., direction, speed, acceleration, etc.), the object 110 is associated with a trajectory 116, and the object 112 is associated with a trajectory 118 determined by the vehicle computing device (e.g., using one or more components). In some examples, the machine learned model 104 may receive path information associated with the trajectories 116 and/or 118 as part of the input data 106.

The vehicle computing device may estimate positions of the object(s) in the environment at a future time based on a detected trajectory and/or predicted trajectories associated with the object(s). In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, another machine learned model may utilize machine learning, linear or signal temporal logic, tree search methods, heat maps, and/or other techniques for determining predicted trajectories and/or estimated positions of object(s).

As mentioned above, the input data 106 can also or instead include map data and/or simulation data (e.g., data associated with a simulation performed by a computing device to test safety of the vehicle 102). In various examples, the machine learned model 104 can determine the output data 108 based at least in part on top-down multi-channel data indicative of a top-down representation of an environment. The top-down representation may be determined based at least in part on map data and/or sensor data captured from or associated with a sensor of the vehicle 102 in the environment 100, and may represent a top-down view of the environment to capture context of the vehicle 102 (e.g., identify actions of other objects such the vehicle 110 and the pedestrian 112 relative to the vehicle).

In some examples, the machine learned model 104 may determine an object representation 120 and an object representation 122 for one or more paths (e.g., the trajectory 116 or other object trajectory) at different times in the future. In such examples, data associated with the object 110 at a current position (e.g., at time T0), the object representation 120 (e.g., at time T1), and/or the object representation 122 (e.g., at time T2) can be used to identify a distance D1 124, a distance D2 126, and/or a distance D3 128 between the vehicle 102 and the object 110 for each respective time. In such examples, the distance D1 124, the distance D2 126, and/or the distance 126 D3 128 can be used to determine the output data 108. For instance, the machine learned model 104 may determine a classifier label at the distance D1 124 indicating that the vehicle behavior is bad (e.g., a time to collision requires a steering action, braking action, and/or acceleration action) because the vehicle 110 is over a centerline 130 and approaching the vehicle 102. In some examples, the machine learned model 104 may determine a classifier label at the distance D2 126 to indicate that the vehicle behavior is good (e.g., has adequate lateral distance to avoid the object 110).

In various examples, the output data 108 can be used to modify a requirement used by an autonomous controller of the vehicle computing device to avoid the object 110 or another object, such as the pedestrian 112. For instance, the vehicle computing device can compare a one or more values of a classification associated with the output data 108 against a requirement (e.g., a lateral distance, a speed, a distance, etc.) and verify and/or modify the requirement. In some examples, one or more components of the vehicle computing device can use the classification (or values associated therewith) associated with the output data 108 in conjunction with a requirement (e.g., a lateral distance, a speed, a distance, etc.). As a non-limiting example, if output data 108 classifies driving behavior of the object 110 as "bad," lateral distance, following distance, etc. may be increased between the vehicle and the object 110. For example, the requirement may be a pass/fail requirement such as if the stopping distance is less than 1 meter, then the requirement is failed. By implementing the machine learned model 104, metrics can be learned for events, such as stopping distance, to indicate that some instances where the vehicle stopped less than 1 meter was actually good behavior, so the requirement may need to be changed. In some examples, the machine learned model 104 may use heuristics and/or receive human input to update a requirement. In some examples, a heuristic indicating that if 95% of cases (or some threshold) that failed the requirement were determined to be "good" behavior, then the requirement for a particular event can be updated.

In some examples, the vehicle computing device can determine that the classification does not correspond to the requirement, and modify the requirement (e.g., increase or decrease a lateral distance to improve safety). In other examples, a comparison between the output data 108 and the requirement can indicate that the vehicle is behaving safely relative to the object 110. In some examples, the requirement can represent a time threshold and/or a distance threshold usable by the autonomous vehicle controller to initiate an action by the vehicle 102 relative to an object (e.g., the object 110, the object 112) or feature in the environment (e.g., the centerline 130, a crosswalk, etc.). Additional details for determining classifier labels are discussed throughout this disclosure including in FIG. 2.

In some examples, a vehicle computing device may control the vehicle 102 in the environment based at least in part on the output data 108 (e.g., determine an action to avoid the object(s) in the environment). For instance, classifications, labels and or vehicle behavior associated with the output data 108 form the machine learned model 104 may be used by the vehicle computing device to cause the vehicle 102 to avoid an intersection with the object 110. Accordingly, the output data 108 may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing the output data 108 are discussed throughout this disclosure.

In various examples, the input data 106 received by the machine learned model 104 may represent object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, or turning rate data associated with the vehicle). As mentioned above, the input data 106 input into the machine learned model 104 may include, in some examples, top-down multi-channel "image" data indicative of a top-down representation of an environment. The machine learned model 104 may also or instead determine the output data 108 based at least in part on an occupancy grid comprising a plurality of grid points representing pixels in the environment. As a non-limiting example, the machine learned model 104 may utilize one or more occupancy grids corresponding to one or more times in the future. If a grid portion overlaps with a known or expected position of the vehicle 102 at a future time, a potential intersection may be determined.

The output data 108 from the machine learned model 104 can be used by a vehicle computing device in a variety of ways. For instance, the vehicle computing device can determine, based at least in part on the output data 108, whether to implement a policy or requirement that is usable to control the vehicle 102 in the environment 100 (e.g., determine a vehicle trajectory and/or control a propulsion system, a braking system, or a steering system). The output data 108 may also or instead be used to perform a simulation by setting up conditions (e.g., an intersection, a number of objects, a likelihood for the object to exhibit abnormal behavior, etc.) for use during the simulation (e.g., by a vehicle computing device or computing device remote from the vehicle) in order to predict motion associated with object(s) in the environment. As mentioned above and below; the output data 108 can be incorporated into a tree search used by the vehicle computing device to determine which branches of the tree to follow over time (at each step of the tree search). That is, when the output data 108 identifies bad vehicle behavior, branches associated with such behavior can be pruned or removed thereby leading to a more efficient overall tree search and/or a more accurate determination by an output of the tree search.

In some examples, the output data 108 can represent object behavior in the environment relative to the vehicle and/or relative to other objects. For example, the output data 108 may represent erratic driving behavior of the vehicle 110. The output data 108 may be based at least in part on weak label data input into the machine learned model 104 that represents conditions usable to determine object behavior (the erratic behavior is based on weak labels that identify the vehicle 102 vehicle or other object(s) in the area as a condition for determining that the vehicle 110 is driving erratically). In another example, the vehicle 110 may exhibit bad object behavior like tailgating, which can be determined based at least in part on the weak label data representing other objects that are not tailgating. By determining object behavior as good object behavior or bad object behavior, the vehicle computing device that controls the vehicle 102 can improve predictions relating to determining a trajectory (or other predictions) to avoid the bad object behavior, or follow the good object behavior.

A training component of a computing device, such as the computing device(s) 436 (not shown) and/or the vehicle computing device 404 (not shown) may be implemented to train the machine learned model 104. Training data may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data may be used to classify behavior of an object and, as such, may include object states, environmental data represented as top-down "images," etc. and be associated with a particular behavioral classification (e.g., "good", "bad", "unknown"). In some examples, such a classification may be based on weak label data, strong label data, and/or user input (e.g., user input indicating that the image depicts a specific type of object) or may be based on the output of another machine learned model. In some examples, such labeled classifications (or more generally, the labeled output associated with training data) may be referred to as ground truth. The training data may be input into the model and an output may be received from the model and compared to the associated particular behavioral classification. Parameters of the model are then adjusted (e.g., by back propagation) such that outputs of the model match the associated classifications. Additional details for training data to determine classifier labels are discussed throughout this disclosure including in FIG. 3.

Figure 2:
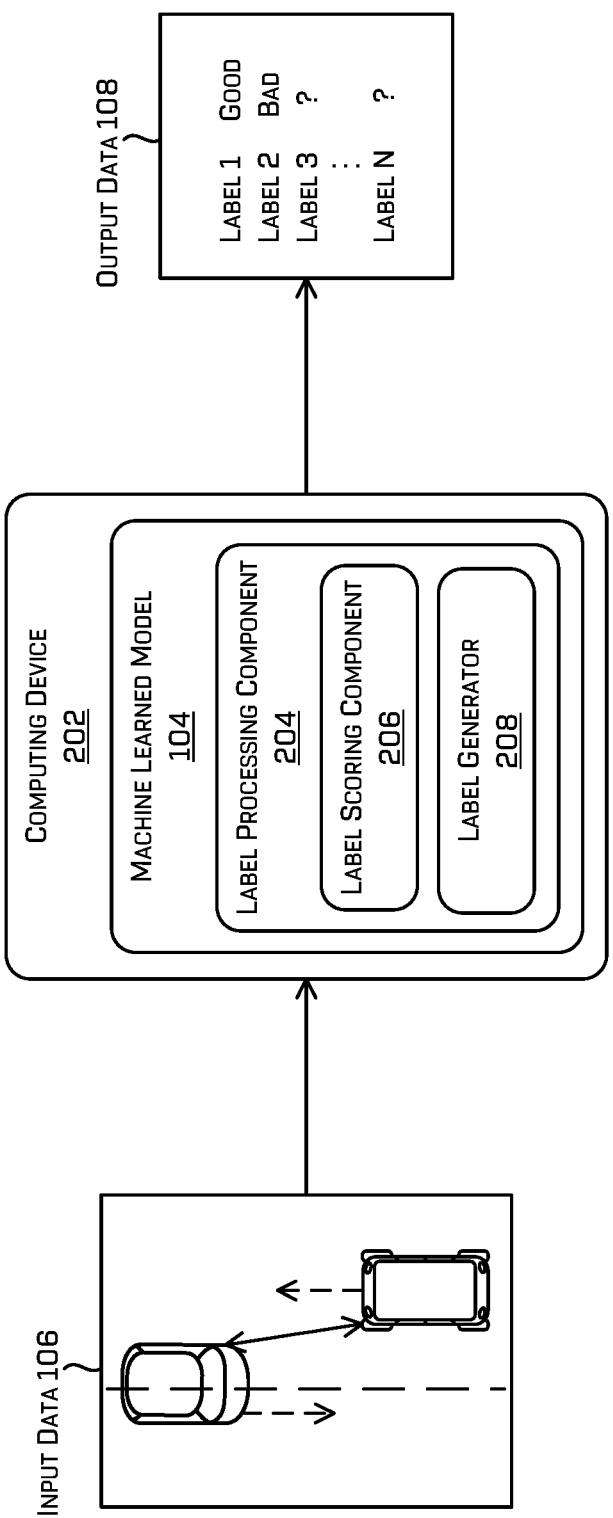
FIG. 2 is an illustration of an example machine learned model that receives example input data to determine classifications usable by an example vehicle computing device.

FIG. 2 is an illustration of an example machine learned model that receives example input data to determine classifications usable by an example vehicle computing device. For instance, a computing device 202 can implement the machine learned model 104 to receive the input data 106 and generate the output data 108. As shown in FIG. 2, the machine learned model 104 comprises a label processing component 204 that further comprises a label scoring component 206 and a label generator 208 usable to determine labels associated with behavior of a vehicle (e.g., the vehicle 102) in an example environment 100. In some examples, the computing device 202 may be associated with a vehicle safety system and may include the vehicle computing device(s) 404 and/or the computing device(s) 436.

The machine learned model 104 can receive two-dimensional (or any dimensional) representations of the example environment 100, log data, simulation data, and/or other data as the input data 106. For example, as part of "preprocessing" the sensor data for use as the input data 106, a model of a vehicle computing device may associate sensor data (or portions thereof) with two-dimensional representations to achieve a desired input data size for more efficient processing. The two-dimensional data representation (also referred to as a two-dimensional representation or a 2D space) may include a vector representation (not shown) and/or a top-down representation of the environment 100.

In various examples, the top-down representation of the environment 100 may be representative of a top-down perspective of the environment and may comprise one or more multi-channel image(s) (e.g., a tensor). The computing device can generate or determine the multi-channel image(s) to represent different attributes of the environment 100 with different channel images (e.g., two-dimensional arrays of data). For instance, an image having multiple channels, wherein each channel is representative of some information (semantic or otherwise). In some examples, one of the channel images can represent an object position, a feature of the environment, an object velocity, an object heading, an object acceleration, an object yaw, an attribute of the object, a vehicle velocity, crosswalk permission (e.g., a crosswalk light or audio state), and traffic light permissibility (e.g., a traffic light state), just to name a few. In this way, the top-down representation can represent objects in the environment 100 (e.g., represented by a bounding box, as discussed herein), semantic information about the object (e.g., a classification type), movement information (e.g., velocity information, acceleration information, etc.), and the like. Additional details of using to-down representations are described in U.S. patent application Ser. No. 16/504,147, filed on Jul. 5, 2019, entitled "Prediction on Top-Down Scenes Based On Action Data," and in U.S. patent application Ser. No. 16/151,607, filed on Oct. 4, 2018, entitled "Trajectory Prediction on Top-Down Scenes," which are incorporated herein by reference in their entirety and for all purposes.

In various examples, label processing component 204 provides functionality to receive and aggregate the input data 106. For instance, weak label data and strong label data, may be associated with values that can be aggregated or combined by the label scoring component 206. In some examples, the value for a "good" behavior label can be greater than 0.6 and less than 1, a "bad" behavior label can between 0.4 and 0.6, and an "unknown" behavior label (shown as "?" in FIG. 2) can be less than 0.4. In this way, a group of labels included in the input data 106 can be used by the label generator 208 to determine a classifier label based at least in part on the input data 106. As shown in FIG. 2, the output data can be associated with label 1, label 2, label 3 up to label N where N is an integer greater than 1. In some instances, the labels output by the machine learned model 104 can be used to generate a scenario to test how the vehicle 102 would behave and/or to train the machine learned model to improve accuracy of vehicle behavior determinations. Further, and as discussed elsewhere throughout this disclosure including in FIG. 3, the output data 108 can be used to verify or adjust a requirement used to verify, validate, or control operation of the vehicle 102 as it navigates to a destination in an environment. By way of example and not limitation, a requirement implemented by a vehicle computing device can cause the vehicle 102 to always react to a green light within a threshold amount of time (e.g., to not anger drivers behind the vehicle). In such an example, if the vehicle 102 delayed reacting to the green light (and therefore failed the requirement), but actually resulted in safer vehicle behavior (due to another vehicle, bicycle, or pedestrian, etc. going through a red light), then the output data 108 from the machine learned model 104 could help identify whether to update or modify the threshold amount of time for the vehicle 102 to react at a green light in future instances.

Figure 3:
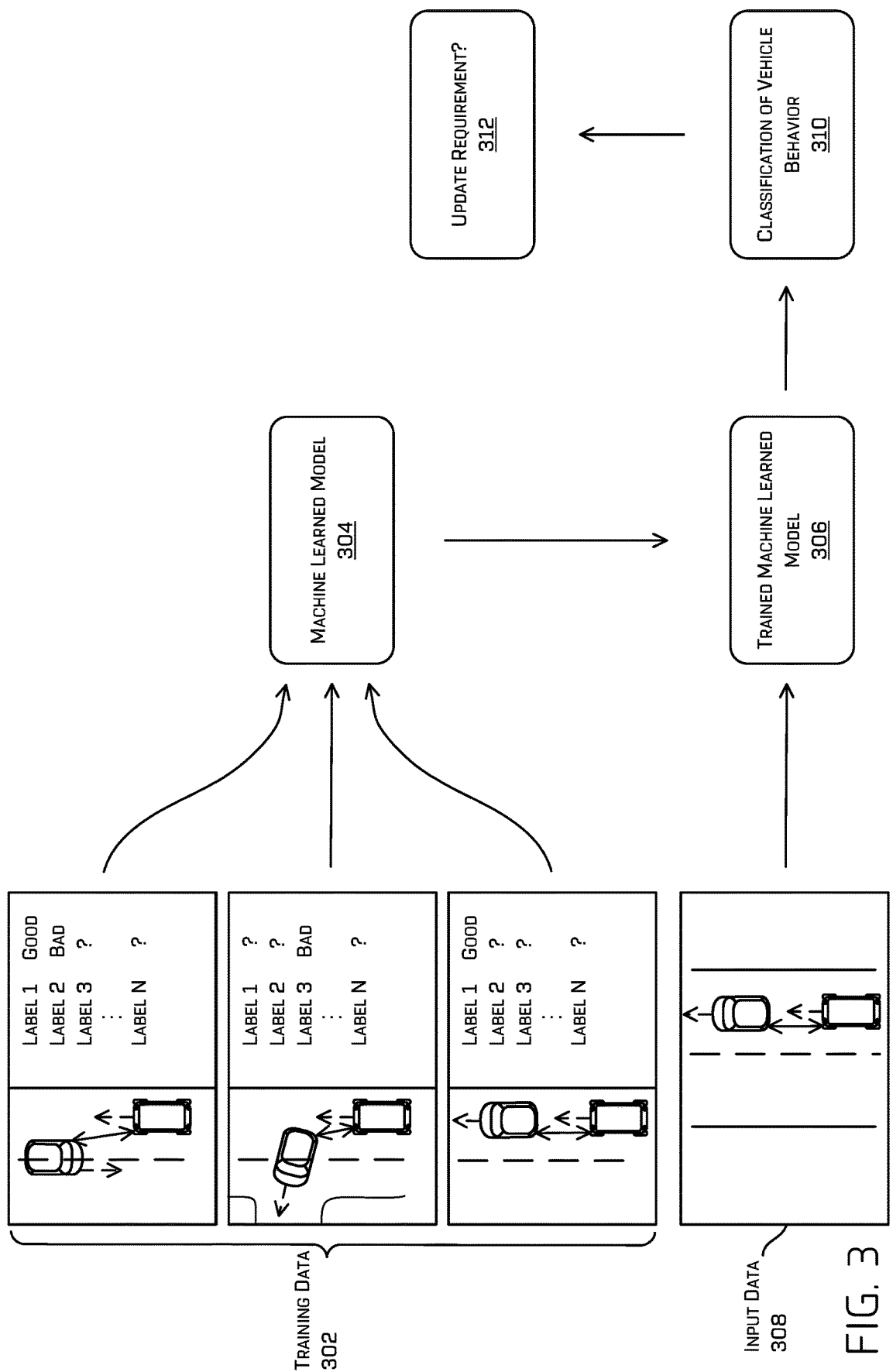
FIG. 3 is an illustration of an example machine learned model that receives example training data to determine classifier labels usable by an example vehicle computing device.

FIG. 3 is an illustration of an example machine learned model that receives example training data to determine classifier labels usable by an example vehicle computing device. For instance, a computing device (e.g., the computing device 202) can generate, receive, or otherwise determine training data 302 representing multiple scenarios (e.g., previous log data and/or a simulation including the vehicle 102) for input into a machine learned model 304.

The training data 302 can include, in various examples, one or more types of data associated with the input data 106. That is, the training data 302 can include weak label data, strong label data, sensor data, map data, and the like. In this way, the training data can be associated with values that can be aggregated by the label scoring component 206. The training data 302 may include a wide variety of data, such as image data, video data, lidar data, radar data, audio data, other sensor data, etc., that is associated with a value (e.g., a desired classification, inference, prediction, etc.). Such values may generally be referred to as a "ground truth." Generally, the machine learned model can provide functionality similar to the machine learned model 104.

A training component of the computing device (e.g., the training component 450) may be implemented to train the machine learned model 104 as a trained machine learned model 306. In some examples, classification labels (e.g., label functions associated with training data) may be used to generate the trained machine learned model 306 that is configured to receive input data 308. The input data 308 can include simulation data describing a scenario associated with a simulation, log data associated with the vehicle 102 associated with the environment 100, or other types of data such as weak label data, strong label data, map data, sensor data, and so on. The trained machine learned model 306 can output a classification of vehicle behavior 310 that classifies the input data 308. In various examples, the classification of vehicle behavior 310 can indicate a good behavior, a bad behavior, and/or an unknown behavior for the vehicle relative to an object in the environment and/or relative to a feature of the environment.

In various examples, the trained machine learned model 306 may be trained with input data (e.g., weak label data) that is received over time and/or represents data collected over a time period in which a vehicle (the vehicle 102) navigates in an environment. For instance, the input data 308 can comprise weak label data and one or more of: environmental data (map data), sensor data, simulation data, vehicle state data, object state data, and so on, that represents vehicle behavior over time. In some examples, the input data 308 may be input into the trained machine learned model 306 over time to enable data output by the trained machine learned model 306 to represent areas or regions in the environment that represent a good region (e.g., a safe region to navigate) and/or a bad region (e.g., a less safe region to navigate). In various examples, the trained machine learned model 306 may include applying a sigmoid function with the output data representing a value between 0 to 1, a hyperbolic tangent function with the output data representing a value between −1 to 1, or other function that generalizes the area or region as good or bad. A threshold may be applied to values output by the sigmoid function to indicate that values close to zero are "bad" (below 0.3) while values close to 1 (above 0.7) are "good" while a threshold may be applied to values output by the hyperbolic tangent function to indicate that values close to −1 (below −0.7) are "bad" while values close to 1 (above 0.7) are "good". However, in other examples the trained machine learned model 306 may apply other functions to determine vehicle behavior or object behavior, such as cross-entropy, area under a curve, and the like. In any case, the trained machine learned model 306 may apply a function that enables continuous output values usable for determining behavior from weak label data and other data input into the trained machine learned model 306.

In some examples, the classification of vehicle behavior 310 can be output to a computing device that is configured for a human operator to verify, validate, or otherwise determine accuracy of the classification to further train the generate the machine learned model 304 and/or the trained machine learned model 306. In various examples, the classification of vehicle behavior 310 can be output to a computing device that is configured to perform a simulation and parameters of the simulation (e.g., the number of objects, roadway types, and so on) can be determined based at least in part on the classification of vehicle behavior 310. In some examples, the classification of vehicle behavior 310 can be output to a computing device to improve detection performance such as detecting a bounding box that represents an object in the environment. In addition or in the alternative, the classification of vehicle behavior 310 can be used to determine heuristics for optimally performing a tree search.

In some examples, the classification of vehicle behavior 310 may be usable by a computing device to update a requirement 312 of an autonomous controller that is configured to control a braking system, a propulsion system, and/or a steering system of the vehicle. In some examples, the classification of vehicle behavior 310 can be compared to a requirement indicating a position, distance, speed, braking metric, or other metric that controls the vehicle relative to an object in the environment. In some examples, the requirement of the vehicle may include one or more of: a time to collision metric, an acceleration metric, a braking metric, a steering metric, a speed metric, a following object metric, an orientation metric, a trajectory metric, a yaw metric, just to name a few: The requirement may remain unchanged based at least in part on the comparison indicating that the classification of vehicle behavior 310 is "good" and changed or modified based at least in part on the comparison indicating that the classification of vehicle behavior 310 is "bad".

In some examples, updating a requirement 312 can include modifying a distance threshold, timing threshold, or other threshold usable to control a vehicle (e.g., change a lateral threshold to be closer or further from an object). For example, a system controller (e.g., system controller(s) 428) can initiate an action (e.g., a magnitude of braking, acceleration, steering, etc.) for the vehicle relative to an object or feature in the environment (e.g., time to leave lane, time to steer, time to brake, distance to pass laterally, etc.).

By way of example and not limitation, consider that the training data 302 includes scenarios in which the vehicle and an object are associated with various distances when the object is oncoming, turning, and/or in front of the vehicle. Labels (labeling functions) that indicate whether the behavior in each scenario is good, bad, or unknown relative to the distances can be used to train the trained machine learned model 306. Then, input data 308 to the trained machine learned model 306 can include a scenario in which an autonomous controller of the vehicle determines whether or not to brake based at least in part on a distance from an object. In such examples, the classification of vehicle behavior 310 can indicate that the vehicle is behaving safely, and the classification of vehicle behavior 310 can be used to increase, decrease, or maintain a requirement that controls whether to brake, and at what distance to initiate braking (e.g., brake tapping to maintain a desired distance for safety and/or comfort of a passenger in the vehicle). Accordingly, as the vehicle navigates in the environment, the classification of vehicle behavior 310 can be used by the vehicle computing device to improve braking or other actions relative to another object. In other examples, the classification of vehicle behavior 310 can determine a requirement for a different object to cause the vehicle behavior to change relative to a pedestrian or other object not included in the input data 308.

While described as a separate system, in some examples, techniques to classify vehicle behavior described herein in relation to FIGS. 1-3 may be implemented by other vehicle systems, components, and/or computing devices. For example, and as will be described in further detail with regard to FIG. 4, the labeling techniques described herein in relation to FIGS. 1-3 may be implemented at least partially by or in association with a perception component, a planning component, and/or a model component of FIG. 4.

Figure 4:
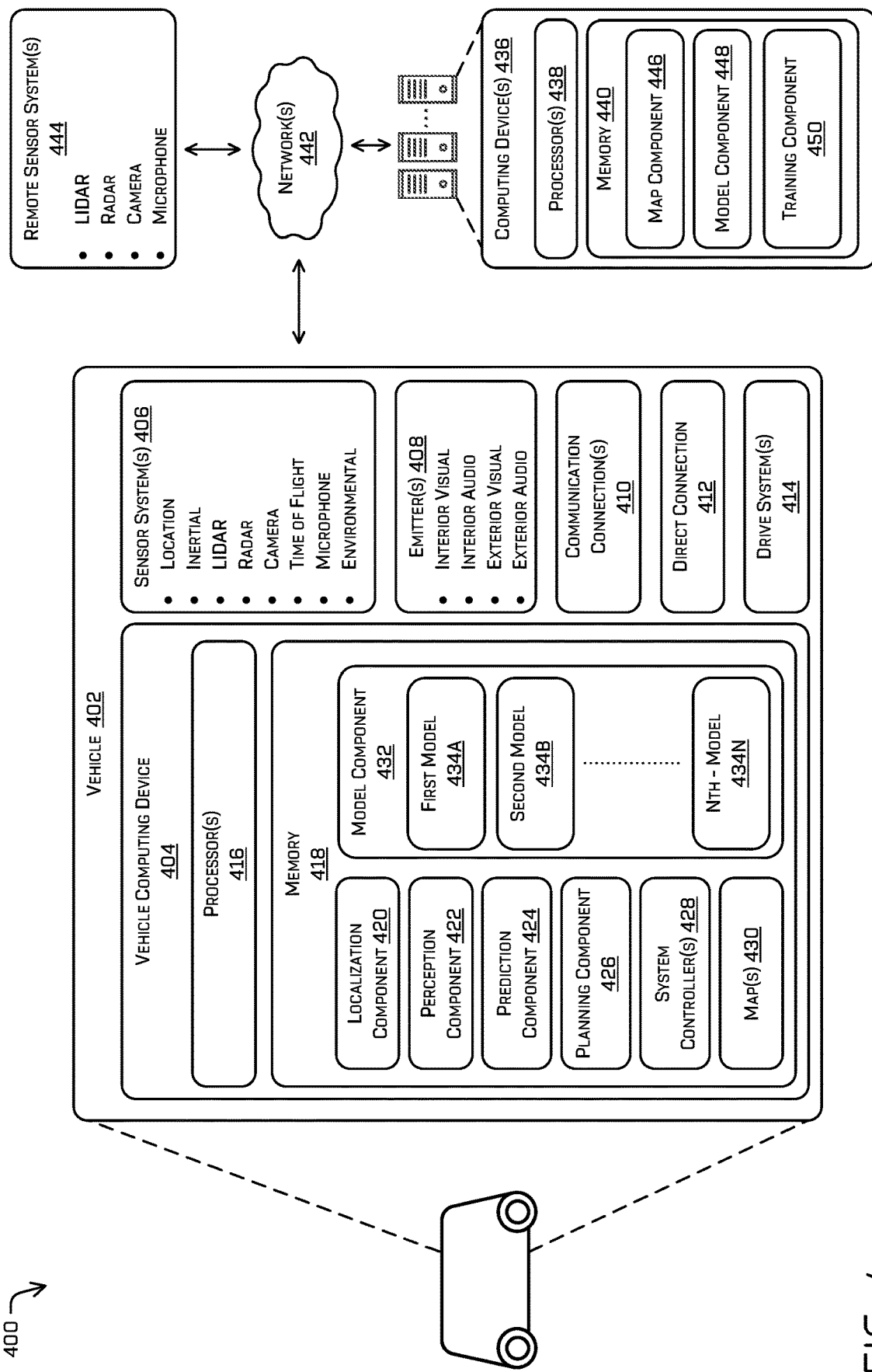
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404, one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In the illustrated example, the memory 418 of the vehicle computing device 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps

430 may have similar memory requirements, but increase the speed at which data in a map may be accessed.

As illustrated in FIG. 4, the vehicle computing device 404 may include a model component 432. The model component 432 may be configured to perform the functionality of the machine learned model 104, the machine learned model 304, and/or the trained machine learned model 306, including predicting vehicle behavior in relation to object intersections, such as with the objects 110 and 112 of FIG. 1. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine classifier label(s) based at least in part on the one or more actions for the vehicle 402. In some examples, the model component 432 may be configured to determine the actions that are applicable to the environment, such as based on environment characteristics, weather characteristics, or the like.

The model component 432 may generate sets of estimated states of the vehicle and one or more detected objects forward in the environment over a time period (e.g., the object representations 120 and 122). The model component 432 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 432 may utilize physics and/or geometry based techniques, machine learning, linear temporal logic, tree search methods, heat maps, and/or other techniques for determining predicted trajectories and/or estimated positions of objects.

In various examples, classifier labels for the estimated states may be generated periodically throughout the time period. For example, the model component 432 may generate estimated states at 0.1 second intervals throughout the time period. For another example, the model component 432 may generate estimated states at 0.05 second intervals.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the model component 432 (e.g., the model(s) 434). In some examples, the sensor data processing component 448 may be configured to send raw sensor data to the vehicle computing device 404.

In some instances, the training component 450 can include functionality to train a machine learning model to output vehicle behavior. For example, the training component 450 can receive data such as weak label data, strong label data, log data representative of drive data, and/or sensor data that represents an object traversing through an environment for a period of time, such as 0.1 milliseconds, 1 second, 3, seconds, 5 seconds, 7 seconds, and the like. At least a portion of the data can be used as an input to train the machine learning model.

In some instances, the training component 450 may be executed by the processor(s) 438 to train a machine learning model based on training data. The training data may include a wide variety of data, such as classifier labels, sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

The training component 450 can, in some examples, be executed by the processor(s) 438 to train a machine learning model based on weak label data with or without other data as input (strong label data, sensor data environment data, and so on). In some examples the weak label data can be used to train a machine learned model of the vehicle computing device 404 while in other examples a machine learned model separate from the vehicle computing device 404 may be trained. In various examples, the weak label data may be associated with metrics such as one or more of: a time to collision metric, an acceleration metric, a braking metric, a steering metric, a speed metric, a following object metric, an orientation metric, a trajectory metric, a yaw metric, just to name a few:

In some instances, the training component 450 can include functionality to train a machine learning model to output classification values and/or continuous values that represent classifications or behavior over time. At least a portion of the data can be used as an input to train the machine learning model. Thus, by providing data where the vehicle traverses an environment, the training component 450 can be trained to output classification representing vehicle behavior relative to objects and/or object behavior relative to the vehicle 402 and/or relative to another object, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
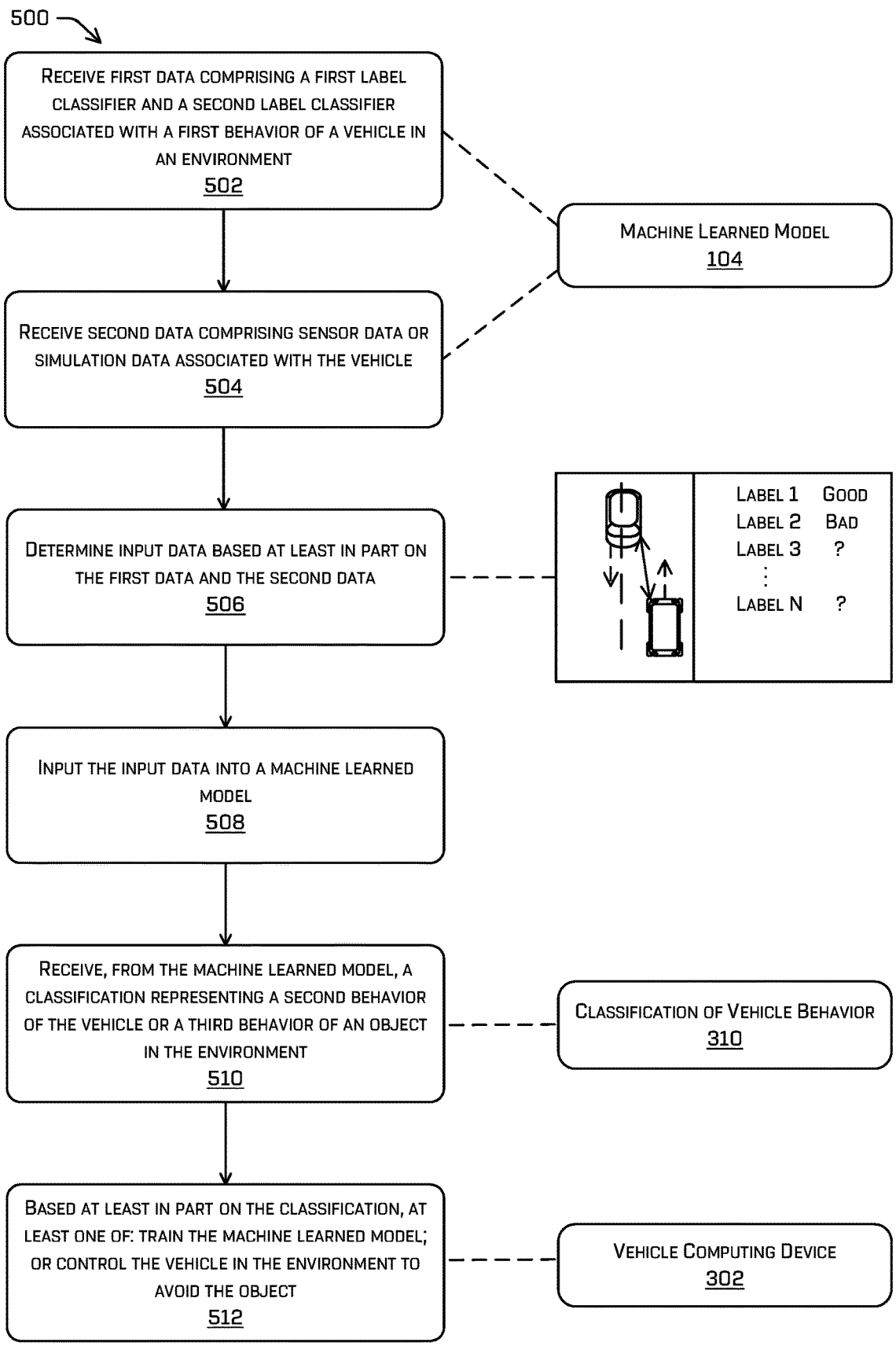
FIG. 5 is a flowchart depicting an example process for determining classifier labels using one or more example models.

FIG. 5 is a flowchart depicting an example process 500 for determining classifier labels using one or more example models. For example, some or all of the process 500 can be performed by one or more components in FIG. 4, as described herein. For example, some or all of the process 500 can be performed by the vehicle computing device 404 and/or the computing device 202.

At operation 502, the process may include receiving first data comprising a first classifier label and a second classifier label associated with a first behavior of a vehicle in an environment. In some examples, the operation 502 may include a vehicle computing device implementing the machine learned model 104 to receive the input data 106 comprising weak label data, strong label data, or a combination thereof. In some examples, the first classifier label and/or the second classifier label can include receiving a greater amount of weak label data than strong label data associated with a simulated environment and/or an environment navigable by the vehicle 102. In some examples, the first classifier label and the second classifier label associated with the behavior of the vehicle can include weak label data.

At operation 504, the process may include receiving second data comprising sensor data or simulation data associated with the vehicle. In some examples, the operation 504 may include the machine learned model 104 receiving sensor data from a lidar sensor, a radar sensor, and so on, of the vehicle 102. In some examples, the sensor data can be processed to determine top-down multi-channel data of the environment. The sensor data may be received from one or more sensors on the vehicle and/or from one or more remote sensors. In various examples, top-down multi-channel data can comprise object state data associated with the object (e.g., a channel of the top-down multi-channel data can indicate a trajectory of the object). The operation 504 may also or instead include the machine learned model 104 receiving log data associated with a simulation involving the vehicle 102 and/or vehicle state data, object state data, map data describing an environment, and the like.

At operation 506, the process may include determining input data based on the first data and the second data. In some examples, the operation 506 may include combining the first data and the second data as training data (e.g., by the label scoring component 206). In some examples, the training data can comprise label functions indicating whether the label is associated with a "good" behavior, a "bad" behavior, or an "unknown" behavior associated with the vehicle 102. The vehicle behavior can, for instance, indicate whether the vehicle is behaving at a safe distance relative to an object in the environment, such as another vehicle, a bicyclist, a pedestrian, and so on. Additionally or in the alternative, the vehicle behavior can relate to initiating an action to avoid an object such as whether to swerve to avoid an oncoming vehicle, whether to initiate braking to avoid a turning vehicle, and/or whether a distance is safe to follow the other vehicle.

At operation 508, the process may include inputting the input data into a machine learned model. In some examples, the operation 508 may include inputting the training data 302 into the machine learned model 104 to train the machine learned model to output a classification indicative of a vehicle behavior.

At operation 510, the process may include receiving, from the machine learned model, a classification representing a second behavior of the vehicle or a third behavior of an object in the environment. In some examples, the operation 508 may include the model component 104 determining the output data 108 based at least in part on aggregated the label functions, sensor data, and/or simulated data associated with the input data 106. In various examples, the classification can represent behavior of the vehicle 102 such as one or more of: a distance to the object, an acceleration action, a braking action, a steering action, a speed limit, or a comfort metric representing comfort of a passenger of the vehicle. For examples, the vehicle behavior may be associated with brake tapping, following an object, and/or avoiding an object.

At operation 512, the process may include based at least in part on the classification, at least one of: training the machine learned model: or controlling the vehicle in the environment to avoid the object. In some examples, the operation 512 may include training the machine learned model 104 to improve the classification. Training the machine learned model 104 may include updating weights, parameters, hyperparameters, and the like to change a future classification output by the machine learned model. In some examples, training the machine learned model 104 may include outputting the classification to a computing device for human verification of the accuracy of the classification and/or to another machine learned model configured to improve accuracy of the machine learned model 104. The operation 512 may also or instead include training the machine learned model 104 to determine a classifier label for a behavior different from the behavior associated with the input data 106.

In other examples, the operation 512 may include the output data 108 being sent to a vehicle computing device that controls one or more actions of the vehicle 102. In some examples, classifications associated with the output data 108 determined by the machine learned model 104 can be used to update a requirement (e.g., a time threshold, a distance threshold, a speed limit, and so on) usable to control the vehicle.

In various examples, process 500 may return to 502 after performing operation 512. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIG. 5 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving first data comprising a first classifier label and a second classifier label associated with a first behavior of a vehicle in an environment; receiving second data comprising sensor data or simulation data associated with the vehicle: determining input data based on the first data and the second data: inputting the input data into a machine learned model: receiving, from the machine learned model, a classification representing a second behavior of the vehicle or a third behavior of an object in the environment; and based at least in part on the classification, at least one of: training the machine learned model: or controlling the vehicle in the environment to avoid the object.

B: The system of paragraph A, wherein the first classifier label indicates a good behavior, a bad behavior, or an unknown behavior.

C: The system of paragraph A or B, the operations further comprising modifying, based at least in part on the classification, an operating parameter of the vehicle, wherein the operating parameter of the vehicle comprises at least one of: a distance to the object, an acceleration action, a braking action, a steering action, a speed limit, or a comfort metric representing comfort of a passenger of the vehicle.

D: The system of any of paragraphs A-C, the operations further comprising: determining a safety metric of the vehicle associated with the first behavior comprising one or more of: an estimated time to collision between the vehicle and the object, a distance between the vehicle and the object, an acceleration of the vehicle, braking of the vehicle, steering of the vehicle, a speed of the vehicle; and at least one of: determining the first classifier label based at least in part on the safety metric: or training the machine learned model to output a third classifier label representing the second behavior of the vehicle different from the first behavior based at least in part on the safety metric.

E: The system of any of paragraphs A-D, the operations further comprising: comparing the classification against a requirement: determining that the classification does not correspond to the requirement; and modifying the requirement.

F: A method comprising: receiving data associated with a vehicle traversing an environment, the data comprising one or more of vehicle state data, environmental data, or object state data: applying a plurality of labeling functions to the data to determine a plurality of classifications: training, as a trained machine learned model, a machine learned model based at least in part on the plurality of classifications, wherein the trained machine learned model is configured to receive input data and to classify, as a classification, the input data as representing one of first vehicle behavior or second vehicle behavior; and verifying a requirement associated with an autonomous vehicle controller based at least in part on the classification.

G: The method of paragraph F, wherein the data comprises simulated data and the environment comprises a simulated environment.

H: The method of paragraph F or G, further comprising modifying, based at least in part on the classification, an operating parameter of the vehicle, wherein the operating parameter of the vehicle comprises at least one of: a distance to an object, an acceleration action, a braking action, a steering action, a speed limit, or a comfort metric representing comfort of a passenger of the vehicle.

I: The method of any of paragraphs F-H, wherein the classification is a first classification, and further comprising: performing a simulation to verify a safety metric associated with the first vehicle behavior or the second vehicle behavior; and training, based at least in part on the safety metric, the machine learned model to output a classifier label representing a second classification different from the first classification.

J: The method of any of paragraphs F-I, wherein the requirement comprises a time threshold or a distance threshold usable by the autonomous vehicle controller to initiate an action by the vehicle relative to an object or a feature in the environment.

K: The method of any of paragraphs F-J, wherein the classification output by the machine learned model indicates one or more of: a good behavior of the vehicle, a bad behavior for the vehicle, or an another classification.

L: The method of any of paragraphs F-K, further comprising: sending the classification output by the machine learned model to a computing device for a human operator to verify an accuracy of the classification.

M: The method of any of paragraphs F-L, further comprising: comparing, as a comparison, the classification against the requirement; and verifying the requirement associated with an autonomous vehicle controller based at least in part on the comparison.

N: The method of any of paragraphs F-M, wherein the data comprises top-down multi-channel data.

O: The method of any of paragraphs F-N, wherein the data comprises weak label data.

P: The method of any of paragraphs F-O, further comprising: modifying, based at least in part on the classification, a tree search for determining an action for the vehicle.

Q: One or more non-transitory computer-readable media storing instructions executable by one or more processors, wherein the instructions, when executed, cause the one or more processors to perform operations comprising: receiving data associated with a vehicle traversing an environment, the data comprising one or more of vehicle state data, environmental data, or object state data: applying a plurality of labeling functions to the data to determine a plurality of classifications: training, as a trained machine learned model, a machine learned model based at least in part on the plurality of classifications, wherein the trained machine learned model is configured to receive input data and to classify, as a classification, the input data as representing one of first vehicle behavior or second vehicle behavior; and verifying a requirement associated with an autonomous vehicle controller based at least in part on the classification.

R: The one or more non-transitory computer-readable media of paragraph Q, wherein the data comprises simulated data and the environment comprises a simulated environment.

S: The one or more non-transitory computer-readable media of paragraph Q or R, further comprising modifying, based at least in part on the classification, an operating parameter of the vehicle, wherein the operating parameter of the vehicle comprises at least one of: a distance to an object, an acceleration action, a braking action, a steering action, a speed limit, or a comfort metric representing comfort of a passenger of the vehicle.

T: The one or more non-transitory computer-readable media of any of paragraphs Q-S, wherein the classification is a first classification, and further comprising: performing a simulation to verify a safety metric associated with the first vehicle behavior or the second vehicle behavior; and training, based at least in part on the safety metric, the machine learned model to output a classifier label representing a second classification different from the first classification.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
      receiving first data comprising a first classifier label associated with a first behavior of a vehicle in an environment and a second classifier label associated with the first behavior of the vehicle, the first classifier label associated with a first level of precision of the first behavior of the vehicle and the second classifier label associated with a second level of precision of the first behavior of the vehicle, the second level of precision different from the first level of precision;
      receiving second data comprising sensor data or simulation data associated with the vehicle;
      determining input data based on the first data and the second data;
      inputting the input data into a machine learned model;
      receiving, from the machine learned model, a classification representing a second behavior of the vehicle relative to an object in the environment or a third behavior of the object; and
      controlling, based at least in part on the classification, an acceleration action, a braking action, or a steering action of the vehicle to cause the vehicle to avoid the object.

2. The system of claim 1, wherein the first classifier label indicates a good behavior, a bad behavior, or an unknown behavior.

3. The system of claim 1, the operations further comprising modifying, based at least in part on the classification, an operating parameter of the vehicle, wherein the operating parameter of the vehicle comprises at least one of:
   a distance to the object,
   an acceleration action,
   a braking action,
   a steering action,
   a speed limit, or
   a comfort metric representing comfort of a passenger of the vehicle.

4. The system of claim 1, the operations further comprising:
   determining a safety metric of the vehicle associated with the first behavior comprising one or more of:
      an estimated time to collision between the vehicle and the object,
      a distance between the vehicle and the object,
      an acceleration of the vehicle,
      braking of the vehicle,
      steering of the vehicle, or a speed of the vehicle; and
at least one of:
  determining the first classifier label based at least in part on the safety metric; or
  training the machine learned model to output a third classifier label representing the second behavior of the vehicle different from the first behavior based at least in part on the safety metric.

5. The system of claim 1, the operations further comprising:
  comparing the classification against a requirement;
  determining that the classification does not correspond to the requirement; and
  modifying the requirement.

6. The system of claim 1, wherein the machine learned model is trained based at least in part on:
  receiving training data associated with previously captured sensor data and/or simulation data, the training data comprising one or more of vehicle state data, environmental data, or object state data;
  applying labeling functions to the training data, the labeling functions including a first labeling function associated with the first level of precision and a second labeling function associated with the second level of precision, the second level of precision different from the first level of precision;
  determining a plurality of classifications based at least in part on a first output from the first labeling function associated with the first level of precision and the second labeling function associated with the second level of precision; and
  training the machine learned model based at least in part on the plurality of classifications.

7. A method comprising:
  receiving first data comprising a first classifier label associated with a first behavior of a vehicle in an environment and a second classifier label associated with the first behavior of the vehicle, the first classifier label associated with a first level of precision of the first behavior of the vehicle and the second classifier label associated with a second level of precision of the first behavior of the vehicle, the second level of precision different from the first level of precision;
  receiving second data comprising sensor data or simulation data associated with the vehicle;
  determining input data based on the first data and the second data;
  inputting the input data into a machine learned model;
  receiving, from the machine learned model, a classification representing a second behavior of the vehicle relative to an object in the environment or a third behavior of the object; and
  controlling, based at least in part on the classification, an acceleration action, a braking action, or a steering action of the vehicle to cause the vehicle to avoid the object.

8. The method of claim 7, wherein the first classifier label indicates a good behavior, a bad behavior, or an unknown behavior.

9. The method of claim 7, further comprising modifying, based at least in part on the classification, an operating parameter of the vehicle, wherein the operating parameter of the vehicle comprises at least one of:
  a distance to the object,
  an acceleration action,
  a braking action,
  a steering action,
  a speed limit, or
  a comfort metric representing comfort of a passenger of the vehicle.

10. The method of claim 7, further comprising:
determining a safety metric of the vehicle associated with the first behavior comprising one or more of:
  an estimated time to collision between the vehicle and the object,
  a distance between the vehicle and the object,
  an acceleration of the vehicle,
  braking of the vehicle,
  steering of the vehicle, or
  a speed of the vehicle; and
at least one of:
  determining the first classifier label based at least in part on the safety metric; or
  training the machine learned model to output a third classifier label representing the second behavior of the vehicle different from the first behavior based at least in part on the safety metric.

11. The method of claim 7, further comprising:
comparing the classification against a requirement;
determining that the classification does not correspond to the requirement; and
modifying the requirement.

12. The method of claim 7, wherein the machine learned model is trained based at least in part on:
  receiving training data associated with previously captured sensor data and/or simulation data, the training data comprising one or more of vehicle state data, environmental data, or object state data;
  applying labeling functions to the training data, the labeling functions including a first labeling function associated with the first level of precision and a second labeling function associated with the second level of precision, the second level of precision different from the first level of precision;
  determining a plurality of classifications based at least in part on a first output from the first labeling function associated with the first level of precision and the second labeling function associated with the second level of precision; and
  training the machine learned model based at least in part on the plurality of classifications.

13. One or more non-transitory computer-readable media storing instructions executable by one or more processors, wherein the instructions, when executed, cause the one or more processors to perform operations comprising:
  receiving first data comprising a first classifier label associated with a first behavior of a vehicle in an environment and a second classifier label associated with the first behavior of the vehicle, the first classifier label associated with a first level of precision of the first behavior of the vehicle and the second classifier label associated with a second level of precision of the first behavior of the vehicle, the second level of precision different from the first level of precision;
  receiving second data comprising sensor data or simulation data associated with the vehicle;
  determining input data based on the first data and the second data;
  inputting the input data into a machine learned model;
  receiving, from the machine learned model, a classification representing a second behavior of the vehicle relative to an object in the environment or a third behavior of the object; and controlling, based at least in part on the classification, an acceleration action, a braking action, or a steering action of the vehicle to cause the vehicle to avoid the object.

14. The one or more non-transitory computer-readable media of claim 13, wherein the first classifier label indicates a good behavior, a bad behavior, or an unknown behavior.

15. The one or more non-transitory computer-readable media of claim 13, the operations further comprising modifying, based at least in part on the classification, an operating parameter of the vehicle, wherein the operating parameter of the vehicle comprises at least one of:
    a distance to the object,
    an acceleration action,
    a braking action,
    a steering action,
    a speed limit, or
    a comfort metric representing comfort of a passenger of the vehicle.

16. The one or more non-transitory computer-readable media of claim 13, the operations further comprising:
    determining a safety metric of the vehicle associated with the first behavior comprising one or more of:
        an estimated time to collision between the vehicle and the object,
        a distance between the vehicle and the object,
        an acceleration of the vehicle,
        braking of the vehicle,
        steering of the vehicle, or
        a speed of the vehicle; and
    at least one of:
        determining the first classifier label based at least in part on the safety metric; or
        training the machine learned model to output a third classifier label representing the second behavior of the vehicle different from the first behavior based at least in part on the safety metric.

17. The one or more non-transitory computer-readable media of claim 13, the operations further comprising:
    comparing the classification against a requirement;
    determining that the classification does not correspond to the requirement; and
    modifying the requirement.

18. The one or more non-transitory computer-readable media of claim 13, wherein the machine learned model is trained based at least in part on:
    receiving training data associated with previously captured sensor data and/or simulation data, the training data comprising one or more of vehicle state data, environmental data, or object state data;
    applying labeling functions to the training data, the labeling functions including a first labeling function associated with the first level of precision and a second labeling function associated with the second level of precision, the second level of precision different from the first level of precision;
    determining a plurality of classifications based at least in part on a first output from the first labeling function associated with the first level of precision and the second labeling function associated with the second level of precision; and
    training the machine learned model based at least in part on the plurality of classifications.

* * * * *